Aug. 28, 1923.　　　　　　　　　　　　　　　　1,465,946

F. MÜLLER

POWER TRANSMISSION CHAIN

Filed Oct. 14, 1922

INVENTOR.

Friederich Müller

BY Gifford, Bell & Scull his ATTORNEYS.

Patented Aug. 28, 1923.

1,465,946

UNITED STATES PATENT OFFICE.

FRIEDERICH MÜLLER, OF HARTFORD, CONNECTICUT.

POWER-TRANSMISSION CHAIN.

Application filed October 14, 1922. Serial No. 594,508.

*To all whom it may concern:*

Be it known that I, FRIEDERICH MÜLLER, a citizen of the United States, residing at Hartford, in the county of Hartford and State of Connecticut, have invented certain new and useful Improvements in Power-Transmission Chains, of which the following is a specification.

My invention relates to improvements in power transmission chains and particularly to that character or type of chain which embodies a plurality of overlapping links pivotally connected at their overlapping portions, the teeth of which are adapted to cooperate with teeth on driving and driven gears; and it consists of certain novel parts, and combinations of parts, particularly pointed out in the claims concluding these specifications.

The following is a description of my invention embodied in forms at present preferred by me; but it will be understood that various modifications and changes may be made therein without departing from the spirit of my invention and without exceeding the scope of my claims.

Figure 1:
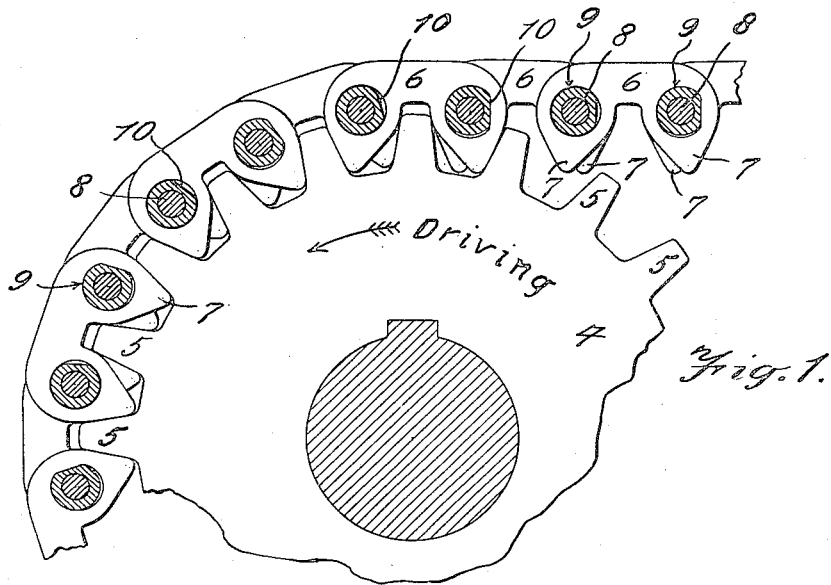
Figure 2:
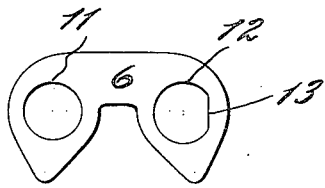

In the accompanying drawings, Figure 1 is an elevation, partly in section, of a gear and a chain embodying my invention and Fig. 2 is a detail of one of the links.

Referring to Figure 1, 4 is a gear, in this case assumed to be a driving gear, moving in the direction shown by the arrow, which gear is provided with teeth 5, 5. The chain shown comprises a plurality of links 6, 6, each link being provided with teeth 7, 7, adapted to engage with the teeth on the gear. 8, 8 are pivots on which the links are mounted. The construction of a chain having in general the elements above described is well known and need not be described more in detail. Indeed, my invention is applicable to all chains of this general type and is not confined to the details here shown.

The pivots proper 8, 8 are preferably provided with bushings 9, 9 preferably having a turning-fit thereon. These bushings are not cylindrical, but have preferably a flat bearing surface 10 on one side. Each link (see Fig. 2) at one end is formed with an aperture 11 which is circular in form and which preferably has a turning-fit on the bushing 9. The opposite end of each link is formed with an aperture 12 which is larger than the bushing on which it is mounted (as shown in Fig. 1), so that there is a clearance space between it and the bushing. This larger aperture is not circular in form but has a bearing surface 13 on one side engaging with the bearing surface 10 on the bushing, so that the bushing and link turn together on the pivot proper. As the aperture 12 is larger than the bushing on which it is mounted, this end of the link has a motion independent of the pivot toward and away from the axis of the gear wheel, the bearing surface 10 sliding up and down on the bearing surface 13. This capacity for sliding movement insures a quiet and smooth running chain. By this arrangement, the wear between the bushing and the link is reduced, because there is afforded, not a line-contact, or small contact, between the bushing and the larger aperture, as would be the case if the bushing were cylindrical, but a relatively large bearing contact surface over which the wear is distributed. The bushings may be omitted, if desired, in which case the pivots proper will be provided with flat bearing surfaces.

The words "pivot member" in the claims will be understood to include not only a pivot proper but a bushing surrounding the pivot proper, when said bushing is used.

What I claim is:—

1. In a power transmission chain comprising links arranged in overlapping relation, pivot members, said links being provided with an aperture at one end having a turning-fit on said pivot member and a larger aperture at the opposite end having a non-turning fit on said pivot member.

2. In a power transmission chain comprising links arranged in overlapping relation, pivots and bushings, said links being provided with an aperture at one end and an aperture at the opposite end of larger dimensions and having a non-turning relation to said bushing.

3. In a power transmission chain comprising links arranged in overlapping relation, pivots, bushings free to turn on said pivots and having a flat bearing surface, said links being provided with an aperture at one end and an aperture at the opposite end of larger dimensions having a flat bearing surface engaging with the flat bearing surface on the bushing.

FRIEDERICH MÜLLER.